June 1, 1965 P. MAYER 3,186,686

HYDRAULIC JACKING SYSTEM

Filed June 27, 1963 4 Sheets-Sheet 1

INVENTOR

Peter Mayer

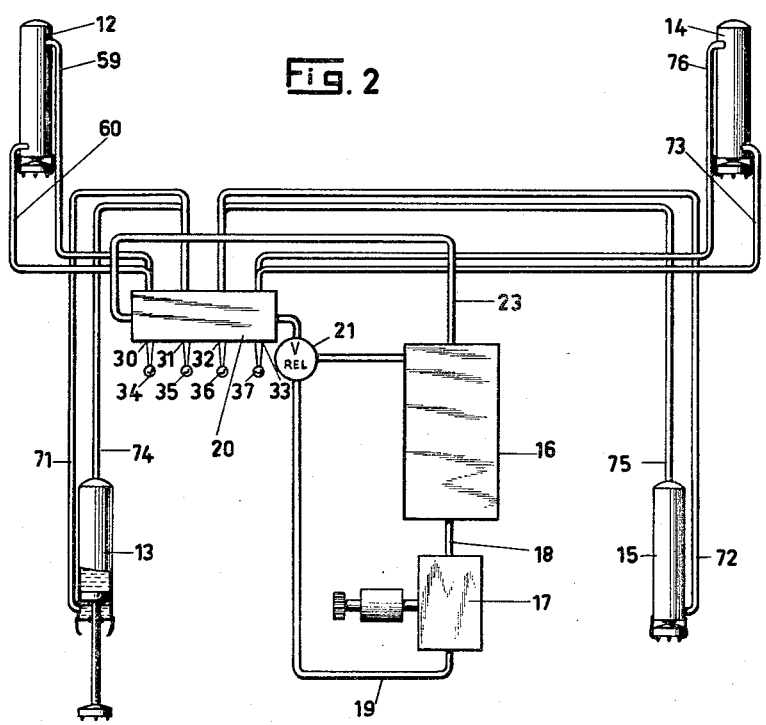
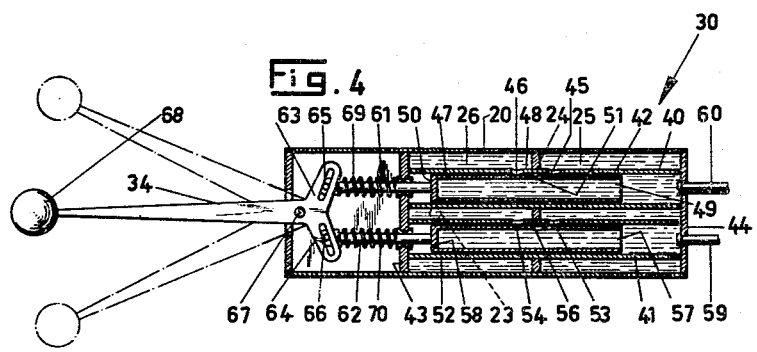

June 1, 1965 P. MAYER 3,186,686
HYDRAULIC JACKING SYSTEM
Filed June 27, 1963 4 Sheets-Sheet 3

INVENTOR
Peter Mayer

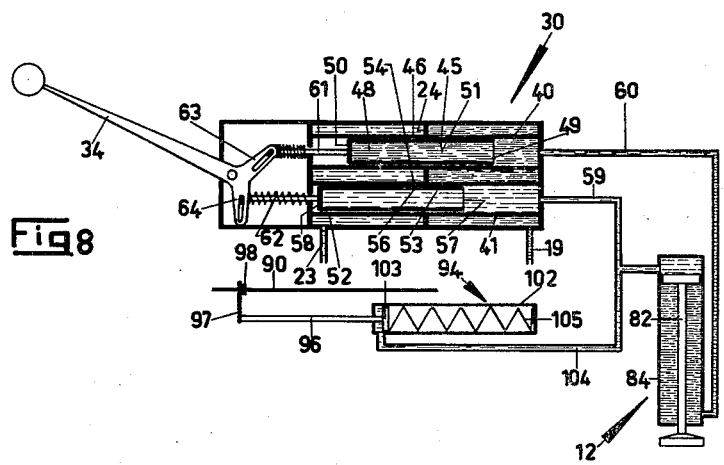
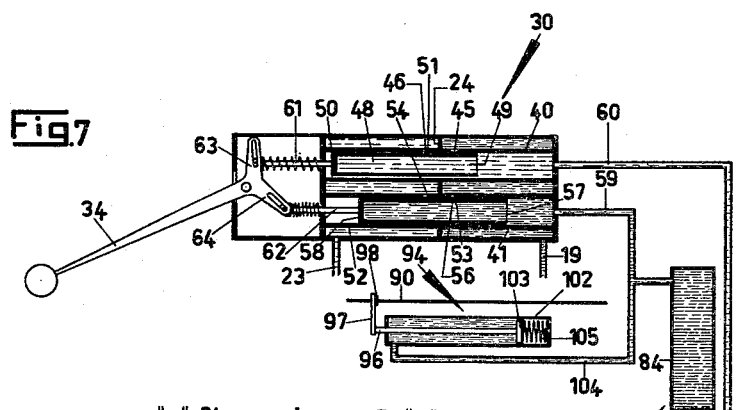
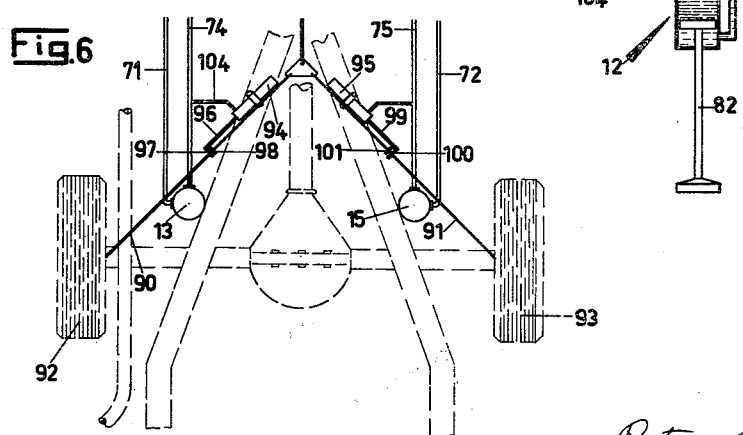

3,186,686
HYDRAULIC JACKING SYSTEM
Peter Mayer, 41 Geoffrey St., Toronto 3,
Ontario, Canada
Filed June 27, 1963, Ser. No. 291,025
3 Claims. (Cl. 254—86)

This invention relates to improvements in hydraulic jacking systems and more particularly to improvements in jacking systems for automotive vehicles operated by power from the engine and controlled from the dashboard of the vehicle.

It is an object of this invention to provide a hydraulic jacking system for automotive vehicles controlled from the dashboard whereby a plurality of hydraulic hoisting jacks that are integral with or attached to a vehicle can be controlled either individually or simultaneously from the dashboard of the vehicle.

It is another object of this invention to provide a hydraulic jacking system for automotive vehicles in which the jacks can be hydraulically locked in any selected extended position.

It is further an object of this invention to provide a hydraulic jacking system for automotive vehicles having fingertip controls which will automatically return to neutral and lock the jacks upon digital pressure being released from the control levers.

It is still further an object of this invention to provide a hydraulic jacking system for automotive vehicles that can be installed both on new vehicles or vehicles now in use.

It is a further object of this invention to provide a hydraulic jacking system for automotive vehicles in which one rear wheel may be raised and the other driven to rotate the vehicle about the operative jack, a braking means being provided to prevent the raised wheel from rotating.

These and other objects and features of this invention will become apparent when taken in conjunction with the accompanying drawings, in which:

FIG. 2 is a diagrammatic view of the complete hydraulic jacking system.

FIG. 4 is a sectional side elevation of the control distributor valve system taken along the lines 4—4 of FIG. 3.

FIG. 6 is a fractional plan view of the vehicle of FIG. 1 illustrating particularly the handbrake system and an auxiliary jack mechanism adapted to apply the handbrake to either of the rear wheels which may be jacked up.

FIG. 7 is a diagrammatic sketch of one rear jack selector of the control distributor valve system, the jack and auxiliary jack shown selected to extend the jack thereby raising one wheel and applying the handbrake thereto through the auxiliary jack.

FIG. 8 is a similar diagrammatic sketch to that of FIG. 7 the selector being moved to retract the jack, lower the wheel and release the pressure of the auxiliary jack on the handbrake cable.

Figure 1:
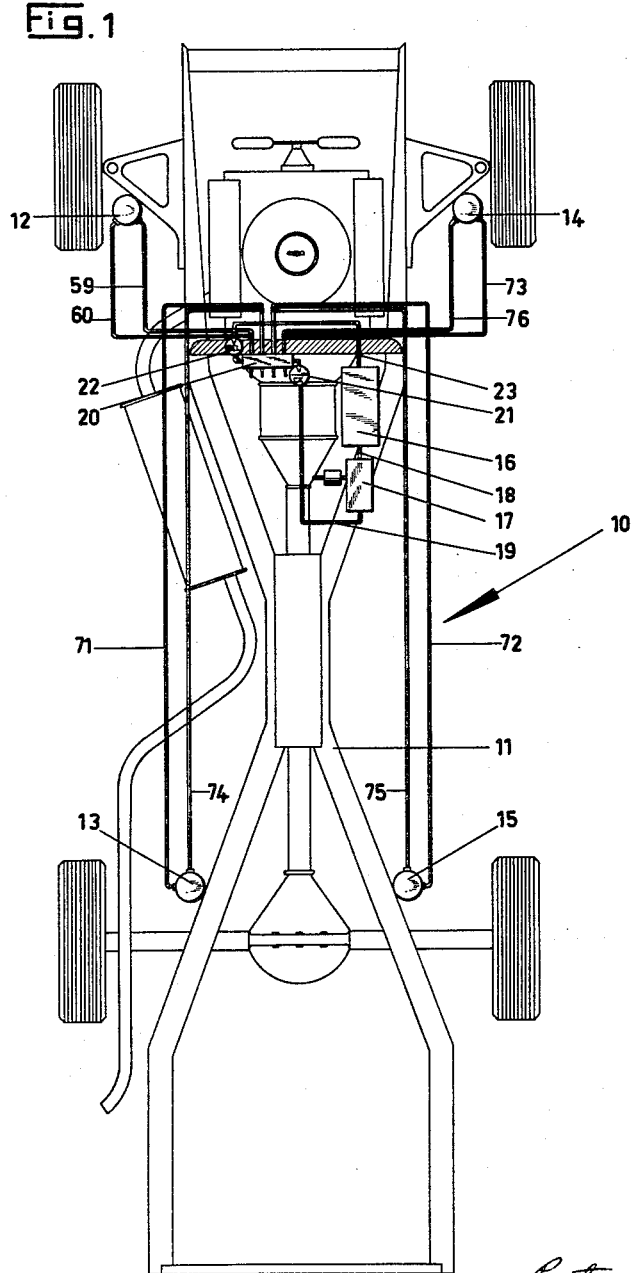
FIG. 1 is a plan view of an automotive vehicle chassis with the hydraulic jacking system mounted thereon.

Referring to FIGS. 1, 2, 3 and 4 the illustrated automotive vehicle chassis of current conventional design, generally designated by the arrow 10, comprises an X built frame 11 with box-section body side rails. Fixedly attached to the forward part of the frame 11 are a pair of vertically operating hydraulic jacks 12 and 14 that are positioned rearward of the front wheels of the vehicle in such a fashion that, in their retracted position, the lowest part of each jack is no lower than frame 11. Similarly, a pair of hydraulic jacks 13 and 15 are fixedly attached to the rearward part of the frame 11 and positioned somewhat forward of the rear wheels of the vehicle.

A hydraulic fluid reservoir tank 16 is suitably mounted on the chassis 10 and a conventional hydraulic pump 17 is connected to the reservoir tank 16 through a fluid supply conduit 18 and hydraulic fluid is thus drawn into the pump 17. The hydraulic pump 17 can normally be driven from the engine of the vehicle, but a suggested alternate method is by an electric motor with power being taken from the battery of the vehicle. The outlet fluid supply conduit 19 from the pump 17 extends to a totally enclosed, parallelepipedical, hollow control distributor valve body 20. A relief valve 21 in the outlet fluid supply conduit 19 is connected to tank 16 to relieve excessive pump pressure and divert the excess fluid back to the tank. A return line 23 extends from the control distributor valve body 20 to tank 16.

Figure 3:
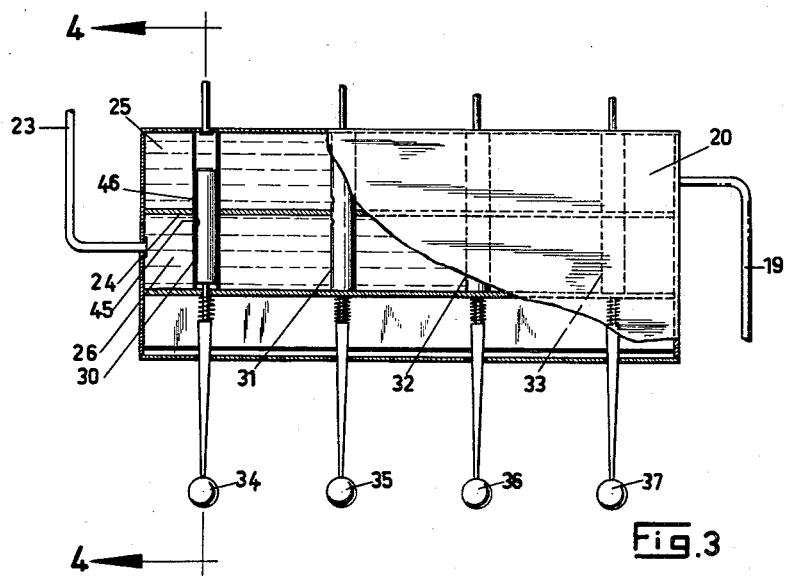
FIG. 3 is a part cutaway part-sectional plan view of the control distributor valve system.

From FIGS. 3 and 4 particularly it will be seen that distributor valve body 20 is divided lengthwise by means of a vertical centre wall 24 into a pressure chamber 25 and a return chamber 26, pressure pipe 19 feeding into chamber 25, and return line 23 placing chamber 26 in communication with tank 16.

Four selector units 30, 31, 32 and 33, operated independently by their respective control levers 34, 35, 36 and 37 are contained in spaced apart relation within body 20, and being substantially identical only one valve unit 30, is herein described.

Unit 30 as illustrated in FIG. 4 comprises an upper valve assembly 40 and a lower valve assembly 41.

Upper valve assembly comprises a tubular outer sleeve 42 extending the complete distance between the rear wall 43 and the front wall 44 of body 20, which, together with centre wall 24, define chambers 25 and 26. The ends of sleeve 42 are in fluid-tight engagement with walls 43 and 44 while centre wall 24 is suitably perforated to permit sleeve 42 to extend therethrough in fluid-tight relation to prevent fluid leakage between chambers 25 and 26.

An orifice 45 is formed through the portion of sleeve 42 within chamber 25 and a similar orifice 46 is also formed through the portion of sleeve 42 within chamber 26.

A piston valve 47 having a hollow cylindrical body 48 is closely slidable within sleeve 42, one end 49 of body 48 being open and the opposite end 50 thereof being closed. End 49 is located within chamber 25 and end 50 within chamber 26. A hole 51 is formed through body 48 which, upon being aligned with orifice 45, permits pressure fluid from chamber 25 to enter body 48, or, alternatively, upon being aligned with orifice 46 permits fluid to pass from body 48 into chamber 26 and thence to tank 16. It should be noted that orifices 45 and 46 are sufficiently far apart that hole 51 may be located in an intermediate position wherein it is entirely blanked off by sleeve 42 and fluid is therefore trapped in valve 47.

Lower valve assembly 41 is similar in all respects to upper valve assembly 40, having a sleeve 52 extending between walls 43 and 44 and passing through centre wall 24, all in fluid-tight relation. Orifices 53 and 54 are formed through sleeve 52 and are located respectively in chambers 25 and 26. A piston valve 55 having a hole 56 therethrough and an open end 57 and a closed end 58, is operable within sleeve 52 in a manner similar to that described for piston valve 47, hole 56 being selectably alignable with orifice 53 of 54 or being blanked off by sleeve 52 in an intermediate position.

A pipe 59 extends from front wall 44 and is adapted to interconnect the bore of sleeve 42 with the lower end of jack 12 while a similar pipe 60 interconnects the bore of sleeve 52 with the upper end of jack 12.

An operating rod 61 extends axially rearwardly from closed end 50 of piston valve 47 to pass slidably through rear wall 43 of body 20, and a similar rod 62 extends rearwardly from closed end 58 of piston valve 55 to pass slidably through wall 43.

Lever 34 is bifurcated at one end to provide two arms 63 and 64, each of which is slotted to slidably receive a connecting pin 65 and 66 respectively which in turn link the outer ends of rods 61 and 62 with arms 63 and 64 respectively. A pivot pin 67 is located through lever 34 rearwardly of arms 63 and 64, so that downward movement of the selector knobs 68 of lever 34 causes the lever to pivot about pin 67 and arm 63 is moved arcuately rearwardly while arm 64 is moved arcuately forwardly. This movement is translated into axial movement of piston valves 47 and 55 through their respective rods 61 and 62 and pins 65 and 66, valve 47 being caused to move rearwardly and valve 55 forwardly.

In this manner, and as more fully illustrated in FIG. 7, downward movement of selector knob 68 therefore results in hole 51 of piston valve 47 becoming aligned with orifice 46 in sleeve 42 thereby placing the lower end of jack 12 in communication with tank 16 through chamber 26, while simultaneously hole 56 in piston valve 55 is aligned with orifice 53 in sleeve 52 allowing fluid under pressure from pump 17 to pass from chamber 25 into sleeve 52 and thence through pipe 59 to the upper end of jack 12.

Under these conditions, jack 12 is caused to extend and therefore raise the vehicle at this particular point.

Conversely, FIG. 8 illustrates the action of unit 20 upon selector knob 68 being raised, piston valve 47 placing the lower end of jack 12 in communication with pressure chamber 25, and piston valve 55 placing the upper end of jack 12 in communication with chamber 26 thereby causing jack 12 to retract.

A coil spring 69 is assembled around rod 61 and a similar spring 70 is assembled around rod 62, both springs 69 and 70 being compressed between rear wall 43 of unit 20 and their respective arms 63 and 64 of lever 34. Springs 69 and 70 are of equal size and strength so that their tendency is to balance out and maintain lever 34 in a central, neutral position. This automatically returns piston valves 47 and 55 to their neutral positions wherein their respective holes 51 and 56 are blanked off, thereby producing a hydraulic lock between unit 30 and jack 12. It will be evident that, at any time selector knob 68 is released, springs 69 and 70 return to their state of equilibrium, moving lever 34 to neutral and placing this particular jack 12 in a hydraulic lock at whatever position it may have attained at the instant of the release of knob 68.

As previously stated, control valves 31, 32 and 33 are connected with their respective jacks 13, 15 and 14 by upper pipes 71, 72 and 73 and lower pipes 74, 75 and 76 respectively and these valves operate in the same manner as that described for valve 30.

Figure 5:
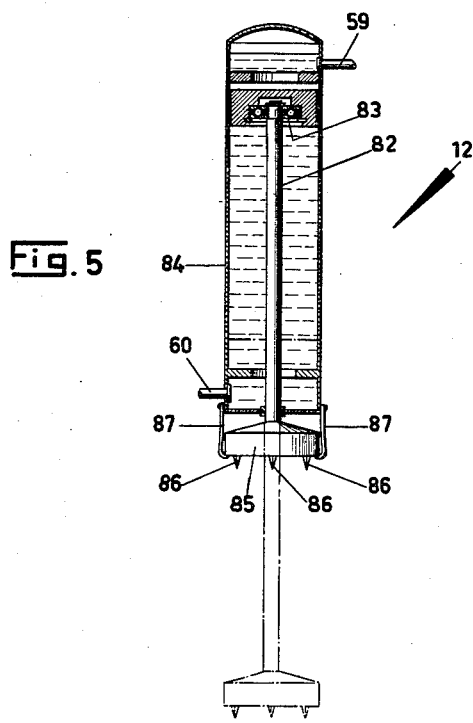
FIG. 5 is a sectional side elevation of one of the jacks shown in idle or raised position with lowered position shown in phantom and showing particularly the rotatable ball bearing assembly, the three pyramid shaped ground engaging feet and the mechanical spring type safety catch.

Referring particularly to FIG. 5, hydraulic jack 12 is of substantially conventional design but has several added features as described herewith.

The upper end of the piston rod 82 of the hydraulic jack has a ball bearing race 83 attached to it making the outer cylinder 84 freely rotatable about it so that when one hydraulic jack is lowered to the ground in order to raise the associated wheel off the ground, the vehicle can if required be rotated 360 degrees about the lowered hydraulic jack. Attached to the lower end of the piston rod 82 is the ground engaging base 85 that has three pyramid shaped feet 86 attached equidistantly around the circumference of said base 85. This has the advantage of giving a substantially better grip on the majority of ground surfaces that may be encountered. The outer cylinder 84 is provided with two spring clips 87 that fit over the ground engaging base 85 when the piston rod 82 is in its fully retractable position so that the said piston rod 82 cannot be shaken loose by vibration or shock. When the piston rod 82 is to be extended, the hydraulic pressure available is sufficient to overcome the tension of said spring clips 87. Jacks 13, 14 and 15 are, of course, of similar construction to jack 12.

Two methods of utilizing a hydraulic jacking system for automotive vehicles embodying this invention are detailed as follows:

Jacking up any or all wheels

With engine of the vehicle running and driving the hydraulic pump 17, or said hydraulic pump being driven by an electric motor from the battery of the vehicle, control handles 34, 35, 36 and 37 as required are operated and the applicable hydraulic jacks 12, 13, 15 and 14 associated with said control handles will extend as desired to raise the wheel(s) or complete vehicle off the ground to a maximum height of approximately 14 inches. To retract said hydraulic jacks, said control handles are again operated and the associated hydraulic jacks will retract and become locked into retracted position by means of spring clips 87.

Parking the vehicle in a restricted space

The driver locates his vehicle directly beside the empty parking space and lets the rear right jack down to the ground to lift the vehicle so that the rear right wheel is off the ground and the weight of the vehicle is resting on the said rear right jack. The two front jacks are let down on the ground to lift the wheels slightly off the ground and the steering wheel is then turned to full right lock. This is simplified by the fact that there is no friction between the wheels and the ground. The two front jacks are then retracted so that the front wheels are again resting on the ground, whereafter the vehicle is put in reverse gear and slowly driven backwards until the vehicle, rotating on the rear right jack stands crosswise to the parking space, the rear portion of the vehicle being in the parking space and the front end being out in the road. The rear right jack is retracted, the vehicle is reversed three or four feet and the rear left jack extended. The two front jacks are again extended and the steering wheel turned to full left lock. The two front jacks are retracted and the vehicle driven slowly in reverse until rotating on the rear left jack, the vehicle is swung into the parking space. The rear left jack is then retracted and the vehicle is manoeuvred until it is centrally located in the parking space.

The foregoing is a suggested method of parking in a restricted space but it is obvious that many uses can be made of the rotatable feature of the hydraulic jacks for assistance in parking, manoeuvring, serving, repair, etc. of the vehicle in question.

From the foregoing description it will be obvious that in vehicles which do not embody a "limited-slip" type of differential it is essential that whichever rear jack is utilized to pivot the vehicle, its associated wheel should be braked or no traction would be gained by the wheel on the ground.

FIGS. 6, 7 and 8 illustrate one preferred method of achieving this braking, and it should be understood that, although the illustration in FIGS. 7 and 8 is of selector valve unit 30 and its associated front jack 12, the braking mechanism is added in diagrammatic form by way of illustration only.

Referring to FIG. 6 specifically, hand brake cables 90 and 91 are shown extending inwardly and forwardly from the brake units of rear wheels 92 and 93 respectively in the conventional manner.

A hydraulic jack 94 is attached to the chassis of the vehicle and is located adjacent to and substantially parallel with cable 90, while a similar jack 95 is similarly located in relation to cable 91.

The jack ram 96 of jack 94 carries a right angled end fitting 97 at the outer end thereof and end fitting 97 is suitably perforated to permit cable 90 to pass freely therethrough. A stop member 98 is securely attached to cable 90 adjacent the side of fitting 97 remote from wheel 92. Upon ram 96 being fully extended, stop 98 does not contact end fitting 97 and cable 90 may therefore be operated over its full range without interference. Upon ram 96 being retracted, however, end fitting 97 contacts stop 98 and therefore places the portion of cable 90 between the brake unit and stop 98 in tension, moving it a sufficient distance to apply that particular brake unit. It will be noted that the portion of cable 90 remote from wheel 92 is caused to slacken upon the braking action as described being carried out, and this ensures that the cable 91 to the brake unit of wheel 93 is not affected.

Similarly, the jack ram 99 of jack 95 carries an end fitting 100 adapted to fit freely over cable 91. A stop 101 on cable 91 is adapted to be contacted by end fitting 100 upon ram 99 being retracted and the brake unit for wheel 93 thereby being applied without affecting wheel 92.

FIGS. 7 and 8 illustrate this action and although the jack 94 is described it will be understood that jack 95 is substantially identical thereto.

Jack 94 comprises a cylindrical body 102 containing the piston 103 from which jack ram 96 extends. A hydraulic line 104 interconnects the outermost end of jack 94 with the appropriate down line 74 to jack 13. The inner end of body 102 in the opposite side of piston 103 is suitably vented and accommodates a strong compression spring 105 adapted to exert an outward force on piston 103 at all times.

In FIG. 7 pressure fluid applied to the main jack through the down line causing the wheel to be raised, is communicated to jack 94 where it acts on piston 103, compressing spring 105 and retracting ram 96.

This, as previously described, causes end fitting 97 to contact stop 98 and apply the appropriate brake.

FIG. 8 illustrates the action upon the main jack being retracted, the down line now being channeled back to tank 16 and pressure relieved, spring 105 forced piston 103 outwardly, expelling the fluid from body 102 and extending ram 96 to permit normal operation of brake cable 90.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. A hydraulic jacking system for vehicles including a plurality of hydraulic jacks secured to the chassis of said vehicle, each of said jacks having a ram extendable vertically downwardly from a housed position to any selected degree of extension; a similar plurality of control valves, each of said valves serving one of said jacks exclusively; hydraulic lines interconnecting each said valve with its particular jack; a hydraulic fluid tank and hydraulic pump supplying pressure fluid to said control valves; each of said control valves comprising an upper valve assembly and a lower valve assembly operable simultaneously; lever means to operate each said control valve; pressure fluid supply means and fluid return means said lever means placing said upper valve assembly in communication with said pressure fluid supply means and placing said lower valve assembly in communication with said fluid return means in a first position; a second position of said lever means placing said upper valve assembly in communication with said fluid return means and said lower valve assembly in communication with said pressure fluid supply means; and a neutral position of said lever wherein said upper and lower valve assemblies are blanked off and fluid therewithin trapped to provide a hydraulic lock, said pressure fluid supply means and fluid return means including a distributor valve body, a wall dividing said body into a pressure chamber and a return chamber; said pressure chamber being supplied with fluid through said pipe means from said pump and said return chamber being connected to said tank; said upper and lower valve assemblies extending across said body and passing through said wall in fluid-tight relation; each of said valve assemblies including an outer sleeve and a piston valve slidable therein; said outer sleeve having a first orifice therethrough located within said pressure chamber and a second orifice therethrough located within said return chamber and said piston valve having a hole therethrough selectively alignable with said first or second orifice and movable to a third position wherein said hole is completely covered by said sleeve; and hydraulic pipes connecting each of said upper valve assemblies with one side of its respective jack and connecting each of said lower assemblies with the opposite side of said jack.

2. A hydraulic jacking system for vehicles including a plurality of hydraulic jacks secured to the chassis of said vehicle, each of said jacks having a ram extendable vertically downwardly from a housed position to any selected degree of extension; a similar plurality of control valves, each of said valves serving one of said jacks exclusively; hydraulic lines interconnecting each said valve with its particular jack; a hydraulic fluid tank and hydraulic pump supplying pressure fluid to said control valves; each of said control valves comprising an upper valve assembly and a lower valve assembly operable simultaneously; lever means to operate each said control valve; pressure fluid supply means and fluid return means said lever means placing said upper valve assembly in communication with said pressure fluid supply means and placing said lower valve assembly in communication with said fluid return means in a first position; a second position of said lever means placing said upper valve assembly in communication with said fluid return means and said lower valve assembly in communication with said pressure fluid supply means; and a neutral position of said lever wherein said upper and lower valve assemblies are blanked off and fluid therewithin trapped to provide a hydraulic lock, said pressure fluid supply means and fluid return means including a distributor valve body, a wall dividing said body into a pressure chamber and a return chamber; said pressure chamber being supplied with fluid through said pipe means from said pump and said return chamber being connected to said tank; said upper and lower valve assemblies extending across said body and passing through said wall in fluid-tight relation; each of said valve assemblies including an outer sleeve and a piston valve slidable therein; said outer sleeve having a first orifice therethrough located within said pressure chamber and a second orifice therethrough located within said return chamber and said piston valve having a hole therethrough selectively alignable with said first or second orifice and movable to a third position wherein said hole is completely covered by said sleeve; and hydraulic pipes connecting each of said upper valve assemblies with one side of its respective jack and connecting each of said lower assemblies with the opposite side of said jack, rod means extending axially outwardly from each said piston valves; each said levers being bifurcated to provide an upper arm and a lower arm; said upper arm being slotted and pivotally attached to said rod of said upper piston valve; said lower arm being slotted and pivotally attached to said rod of said lower piston valve; pivot pin means supporting said lever, arcuate movement of said lever in one direction placing it in said first position and arcuate movement of said lever in the opposite direction placing it in said second position; and resilient means co-operable with said lever returning said lever to said neutral position upon the removal of selective force therefrom.

3. A hydraulic jacking system for vehicles including a plurality of hydraulic jacks secured to the chassis with one of the jacks adjacent each rear wheel of said vehicle, each of said jacks having a ram extendable vertically downwardly from a housed position to any selected degree of extension; a similar plurality of control valves, each of said valves serving one of said jacks exclusively; hydraulic lines interconnecting each said valve with its particular jack; a hydraulic fluid tank and hydraulic pump supplying pressure fluid to said control valves; each of said control valves comprising an upper valve assembly and a lower valve assembly operable simultaneously; said lever means to operate each said control valve; pressure fluid supply means and fluid return means, said lever means placing said upper valve assembly in communication with said pressure fluid supply means and placing said lower valve assembly in communication with said fluid return means in a first position; a second position of said lever means placing said upper valve assembly in communication with said fluid return means and said lower valve assembly in communication with said pressure fluid supply means; and a neutral position of said lever wherein said upper and lower valve assemblies are blanked off and fluid therewithin trapped to provide a hydraulic lock, auxiliary hydraulic jack means located adjacent each handbrake cable to the brake units of the rear wheels of said vehicle and attached to the chassis of said vehicle; each of said auxiliary jacks having a ram; a bracket attached to the free end of each said ram; each said bracket having a hole therethrough and its respective brake cable passing freely through said hole; in a first position of said ram stop means on said cable co-operable with said bracket to tighten said cable and operate said brake unit upon said ram moving said bracket away from said brake unit to a second position; pipe means interconnecting one side of said auxiliary jack with the upper end of the jack adapted to raise the relevant rear wheel to provide pressure fliud to said jack to move it to said second position upon said rear wheel being raised; and resilient means moving said ram and said bracket to said first position upon said jack being retracted.

References Cited by the Examiner

UNITED STATES PATENTS 1,974,705   9/34   De Vaal.
2,472,294   6/49   Hall.
2,919,106   12/59  Le Mieux et al.

WILLIAM FELDMAN, *Primary Examiner.*

MILTON S. MEHR, *Examiner.*